United States Patent Office 3,475,513
Patented Oct. 28, 1969

3,475,513
CURABLE COMPOSITIONS COMPRISING EPOXY NOVOLAK AND HYDROXYL-CONTAINING POLYARYLENE ETHER
Burton A. Benson, Richfield, Minn., assignor to Minnesota Mining and Manufacturing Company, St. Paul, Minn., a corporation of Delaware
No Drawing. Filed June 12, 1967, Ser. No. 645,464
Int. Cl. C08g 51/58, 30/10
U.S. Cl. 260—830                     16 Claims

ABSTRACT OF THE DISCLOSURE

Certain thermohardenable resin compositions comprising a blend of a soluble epoxy novolak polymer, a curing agent, and an aromatic high temperature stabilizer and, if desired, an accelerator are disclosed. These compositions cure to form materials which have superior resistance to long term aging at temperatures of 200°–300° C. They can be used in filament-reinforced structures, coating, adhesives, insulating materials, molded articles, etc.

BRIEF SUMMARY OF THE INVENTION

The present invention relates to novel, heat-resistant polymeric materials and to articles containing such materials.

The field of heat resistant polymeric materials is in a state of rapid change, due to increasing technological demands, e.g. in the aerospace area. Thus, polymers (often utilized in filament-reinforced structures), are needed which will retain good mechanical properties over long periods of time in the range of 200°–300° C. and even higher. Because of the rapid development in this field, the demand for resins with better and better performance and fabrication properties has often outdistanced the available polymers. Thus, for example, phenolic resins which have been widely used in the field generally have unsatisfactory heat resistance (i.e. maintenance of strength during exposure to high temperatures) for certain applications. Resins with greater heat resistance have been developed for such applications (e.g. copolymers of phenolic and silicone resins), but these are generally very difficult and expensive to fabricate. Thus the phenolic-silicone copolymers give off volatiles during curing and, consequently, laminated structures of such copolymers must be cured under high presssure at gradually increasing temperatures over a long period of time to avoid delamination.

The present invention relates to resin compositions and articles which are easily fabricated (not requiring high pressure molding or complex cure cycles) which also have excellent heat resistance properties. These compositions and articles thus have the combination of excellent fabrication and heat resistance properties previously desired but unavailable.

It is therefore an object of the invention to provide a novel and useful class of resin compositions.

It is another object of the invention to provide novel filament-reinforced structures.

It is another object of the invention to provide a thermohardenable blend of an epoxy novolak polymer, a curing agent for an epoxy resin and a thermally stable aromatic stabilizer therefor.

It is another object of the invention to provide a cured reaction product of an epoxy novolak polymer, a curing agent for an epoxy resin and a thermally stable aromatic stabilizer therefor.

It is another object of the invention to provide a mixture of a curing agent for an epoxy resin, a non-volatile aromatic stabilizer and an accelerator for an epoxy resin, said mixture being adapted to be mixed with an epoxy novolak to form a thermohardenable resin composition.

Other objects of the invention will become apparent to those skilled in the art upon reading the following specification.

DETAILED DESCRIPTION

The present invention provides a stable, thermohardenable resin composition comprising a blend of an epoxy novolak polymer, a curing agent for an epoxy resin and a non-volatile, thermally stable, aromatic high temperature stabilizer which has a number average molecular weight of 400 or greater and a hydroxyl equivalent weight of from about 160 to 10,000.

These resin compositions can be used in adhesives, coatings, electrical and thermal insulating materials, in molded articles etc., particularly where high temperature resistance is desired therein. They are also suitable for use together with filaments to form filament-reinforced structures. The latter structures constitute a distinct aspect of the invention.

Preferably the resin compositions of the invention are prepared containing from about 30 to 75 percent epoxy novolak, from about 20 to 65 percent curing agent and at least 3 percent stabilizer (the percentages being by weight and the sum of these three ingredients being 100 percent). The high temperature properties of the compositions of the invention can also be observed outside these ranges. A class of compositions of the invention preferred for many applications also contain an accelerator for epoxy resins since these compositions cure at a considerably higher rate. This class of compositions of the invention normally contain an effective amount (at least 0.5 percent) of the accelerator together with 30 to 75 percent epoxy novolak, 20 to 65 percent curing agent and 3 to 30 percent stabilizer. The particularly preferred compositions for many uses (since they maximize economy of the ingredients and ultimate properties) contain about 45 to 50 percent epoxy novolak, 35 to 45 percent curing agents, 10 to 15 percent stabilizer and 1 to 5 percent accelerator. (The percentages in the foregoing are by weight and total 100 percent for each composition.)

The reason for the excellent heat resistance properties of the compositions of the invention is not known. Although the invention is in no way conditioned thereon, a possible explanation is that the stabilizer acts as a free radical anti-oxidant (i.e. radical scavenger) which is non-volatile at high temperatures and therefore remains in the compositions even after exposure to high temperatures for extended periods of time.

The high temperature stabilizers utilized in the compositions of the invention are polymers or relatively high molecular weight compounds. They are aromatic in nature although they can contain single quaternary carbon atoms (which are not bonded to hydrogen) between aromatic rings. Likewise, aromatic rings therein can be separated by other non-reactive groups such as oxygen, sulfone and carbonyl. Often the stabilizers contain only carbon, hydrogen and oxygen and, in some cases, residual amounts of halogen from the starting materials. Preferably, the stabilizers contain no reactive groups other than hydroxyls. Preferably also they have number average molecular weights of from about 500 to 5000, and hydroxyl equivalent weights of 250 to 8000.

A particularly useful class of stabilizers are the arylene ethers (both compounds and polymers). These include poly-(arylene ethers) made by the condensation of aromatic diols with polyhaloaromatic compounds. Suitable polyhaloaromatic compounds include dichloro, trichloro tetrachloro, dibromo, and tribromo derivatives of benzene and similar di- and trihalo derivatives of biphenyl and terphenyl, etc. This condensation can be carried out in such a way as to avoid or minimize the formation of long chains of a repeating structural unit. Instead arylene ethers of about 500 to 1500 molecular weight which ethers contain an average of more than one phenolic hydroxyl per molecule can be formed.

A class of polymeric arylene ethers preferred in the compositions of the invention are the hydroxyl containing poly(phenylene oxides). A particularly useful polymer of this type has a ratio of 65% para-phenylene oxide units to 35% ortho-phenylene oxide units. The poly(phenylene oxides) can be conveniently prepared in either of two ways. In the first, crystallized alkali metal salts of monohalophenols (e.g. potassium p-chlorophenol and potassium o-chlorophenol) are prepared separately and mixed in the desired proportions before polymerization. To these mixtures are added a polymerization catalyst (e.g. cuprous chloride) and, desirably, a minor amount of an aromatic polyhydroxy compound. At least a small amount of pyridine or quinoline (usually 2–100% based on the weight of phenolic salts) is also present during polymerization. The aromatic polyhydroxy compound, although it is not essential, has the effect of increasing the hydroxyl content and lowering the molecular weight of the resulting polymer (by acting as a chain-terminating reagent). The use of aromatic trihydroxy compounds or thier salts as terminating agents has the effect of putting some branching in the polymer chains.

The second method of preparation of the hydroxy-containing poly(phenylene oxides) is similar to the first but involves the use of halophenol salts which have not been crystallized from a slovent but which are prepared by neutralization, drying and polymerization all in the same reaction vessel. In this system the aromatic polyhydroxy compound can be added at the first of the reaction, at some intermediate point in the condensation (polymerization) step, or the end of the polymerization. The usual and most convenient procedure is to charge the aromatic polyhydroxy compound at the very first of the preparation when the chlorophenols, alkali and solvent are also charged. This mixture is then dried by azeotropic distillation, catalyst is added, the mitxure is heated and stirred and finally the polymer is recovered. Included among the aromatic polyhydroxy compounds that can be used in the preparation of the arylene ether compounds and polymers are hydroquinone, 4,4'-oxydiphenol, 2,2'-oxydiphenol, 1,5-naphthalenediol, 4,4'-isopropylidenediphenol, p,p'-biphenol and o,o'-biphenol.

The curing agents of the compositions of the present invention are epoxy resin curing agents which include anhydride, acid, phenolic and amine curing agents. The preferred curing agents are of the anhydride or acid anyhdride type and include phthalic anhydride, hexahydrophthalic anhydride, tetrahydrophthalic anhydride, maleic anhydride, dodecenyl succinic anhydride, pyromellitic dianhydride, 3,6-endomethylene-1,2,3,6-tetrahydrocis-phthalic anhydride, 3,6-endomethylene-1,2,3,6-tetrahydro-3(4)-methylphthalic anhydride, etc.

Novolaks suitable for use in producing the opoxy novolaks hereof are prepared by reacting phenol, a substituted phenol (e.g. a lower alkyl, aryl or hydroxy-substituted phenol such as m-cresol, resorcinol, hydroquinone, naphthol, etc.) or a mixture thereof with a monoaldehyde or dialdehyde (such as formaldehyde, acetaldehyde, furfural, glyoxal, etc.) or a mixture thereof by one of the methods known for producing novolaks. The novolaks are thermoplastic polymers which are linear or branched and which contain recurring hydroxyl groups. Although many different combinations of phenols and aldehydes can be used to form the novolak resins, phenol and formaldehyde are usually utilized and the compositions of the invention uitlmately prepared from novolaks of phenol and formaldehyde form a preferred class. The epoxy novolaks are prepared from the novolaks by epoxidizing the hydroxyl groups thereon utilizing known methods.

The compositions of the invention (containing the stabilizer, the curing agent and the epoxy novolak) are sometimes utilized directly, without modification. More frequently, and preferably, however, they also contain an accelerator to shorten the cure time. The accelerators useful in the compositions are known accelerators for epoxy resins, and are normally Lewis bases, i.e. electron donors. They include tertiary amines and phosphite esters. Specific useful accelerators are benzyl dimethyl amine, dimethyl amino methyl phenol, etc.

The hardenable resin compositions of the invention can be prepared (mixed) and used in various ways, depending upon the specific ingredients used, the manner of use and the ultimate properties desired (i.e. upon the end use). Thus, for example, it is sometimes desirable to premix the curing agent, the stabilizer and the accelerator. This mixture can then later be combined with the epoxy novolak to form the thermohardenable composition.

The compositions must be compatible, that is the stabilizer, the curing agent, the epoxy novolak and the accelerator (if one is used) must form a single phase during preparation or use. These ingredients can be either liquids or solids. Solvents can be used if desired to dissolve solid constituents and/or to reduce the viscosity of liquid constituents or of the composition itself. One or more of the constituents may be a liquid and the composition itself may therefore be a liquid without the addition of a solvent. Alternatively, the composition may be solid at ordinary temperatures and hot melt techniques used in its application. Among the solvents which can be used with the compositions of the invention are benzene, toluene and xylene, chlorinated solvents such as chloroform and methylene chloride, pyridine, tetrahydrofuran, dimethylformamide, dioxane, dimethyl acetamide, N-methyl pyrrolidone and diphenyl ether.

The compositions of the invention are normally cured with application of heat. The fully cured compositions are generally characterized as being tough, strong, non-fusible, non-soluble and chemically, hydrolytically and thermally inert.

Often it is desirable to load or extend the resinous compositions, e.g. by the addition of fillers such as calcium carbonate, iron oxide, titanium dioxide, Fuller's earth, quartz flour, asbestos, etc. or otherwise modify the electrical, physical or chemical properties of the resin by the incorporation of plasticizers, colorants, resins, conductive materials such as carbon or metal powders, etc. which may be considered as adjuvants and the like.

As noted previous, filament-reinforced structures prepared utilizing the compositions of the invention form a separate and particularly important aspect of the invention. As used herein, the term "filament" includes fibers, continuous or staple type, strands, yarns, rovings, fabrics, woven and nonwoven textile materials and paper, formed therefrom, etc. The filaments may be of glass, metal, other inorganic materials (such as asbestos), synthetic polymers (such as nylons and polyimides), natural fibers, etc. The preferred filaments for use in the structures of the invention are of glass, including continuous or staple type and strands, yarns, rovings, fabrics or textile materials formed thereof. These glass filament-reinforced polymeric structures of the invention have excellent long-term high temperature aging properties (i.e. excellent strength retention during long term aging at temperatures in the range of 200°–300° C.) and are therefore of great utility as materials of construction in the aerospace area and in other areas in which such high performance is needed.

The following examples illustrate more specifically the preferred embodiments of the invention but are not to be construed as limiting thereof. Unless otherwise specifically indicated, all parts are given by weight and the amounts of the polymers, curing agents, etc. in the formulations are given on a solids basis. Pressures and strength or modulus readings are given in pounds per square inch (p.s.i.) or kilograms per square centimeter (kg. per sq. cm.).

STABILIZER PREPARATION

Example A

Preparation of poly(phenylene oxide) stabilizers: The preparations of potassium p-chlorophenolate with pyridine of crystallization and potassium o-chlorophenolate without pyridine of crystallization are described in Brit. 1,053,053.

A heavy-walled glass ampoule was flamed out under high vacuum, filled with nitrogen and allowed to cool before being filled with cuprous chloride (20 mg., 0.2 mole percent), 4,4'-isopropylidenediphenol (.34 g., 1.5 mole percent), potassium p-chlorophenolate with pyridine of crystallization (14.2 g., .065 mole) and potassium o-chlorophenolate without pyridine of crystallization (5.8 g., .035 mole). The ampoule was evacuated, flushed with nitrogen and sealed under vacuum. It was then heated in a rocking furnace for 6 hours at 160° C. followed by 24 hours at 225° C. After being cooled to room temperature, the ampoule was opened and the contents washed with dilute hydrochloric acid, water and finally methanol. The solid polymer, a buff powder, was dried at 50° C. in a vacuum oven. It softened over the range of 90–110° C. and dissolved in several common organic solvents such as toluene, pyridine, tetrahydrofuran or chloroform. The inherent viscosity in 1% chloroform solution was .15. The number average molecular weight by vapor pressure osmometry ($M_{vpo}$) was 3240 and hydroxyl equivalent weight by the method of Ogg, Porter and Willits, Ind. Eng. Chem., Anal. ed., 394, June 1945, was 1270. The yield was 8.8 g., or 92%.

The following table lists pertinent data relative to various poly(phenylene oxide) stabilizers prepared in the manner just described. Data relative to the stabilizer of Example A are included for comparison.

with nitrogen while the base was allowed to flow into the soluiton during 5–10 minutes. The system was then restored to atmospheric pressure with nitrogen. Heat was applied while a slight positive pressure of nitrogen was maintained.

Water was removed by azeotropic distillation via the Dean-Stark trap until no further water separated from the benzene distillate. The solution in the flask at this point was light straw color and its temperature was 120–125° C.

The magnetic stirrer and the packed column were then removed, a mechanical stirrer was placed in the center neck, and the Dean-Stark trap and reflux condenser were put in the side neck in place of the dropping funnel. Solvent was removed through the Dean-Stark trap until the solution temperature reached 160° C. A solution of cuprous chloride (.40 g., .004 mole) in pyridine (60 ml.) was added (conveniently by injection through the rubber tubing of the nitrogen inlet with a hypodermic syringe) and the temperature was maintained at 160–170° C. for 3.5 hours by removal of additional solvent as needed. Finally the temperature was raised to 250° for 2 hours and the reaction was stopped by dilution with 200 ml. of pyridine.

After cooling, the mixture was precipitated in methanol using a blender or other rapid stirring device to disperse the solid polymer.

The slurry was filtered and the solid was washed successively with water, methanol, dilute hydrochloride acid, water and finally methanol before being dried in a vacuum oven at 40° C. The yield was 179.5 g., or 94%. The inherent viscosity is 1% chloroform solution was .16. The polymer softened at 65–70° C. and flowed in a capillary tube below 150° C. It was soluble in a variety of solvents including benzene, toluene, pyridine, chloroform and tetrahydrofuran. The number average molecular weight by vapor pressure osmometry (VPO) was 1700 and the hydroxyl equivalent weight was 1340 when determined by the method of Ogg, Porter and Willits, cited previously.

| | Diol added | | Product | | |
|---|---|---|---|---|---|
| | Compound | Mole percent | $[\eta]$ in 1% CHCl$_3$ soln. | $M_{vpo}$ | Hydroxyl equiv. wt. |
| Example: | | | | | |
| A | 4,4'-isopropylidenediphenol | 1.5 | .149 | 3,240 | 1,270 |
| B | None | | .202 | 3,250 | 8,100 |
| C | Hydroquinone | 2.5 | .057 | 1,800 | 1,050 |
| D | 4,4'-oxydiphenol | 2.5 | .088 | 3,040 | 1,650 |
| E | do | 1.5 | .131 | 2,790 | 2,150 |
| F | 4,4'-isopropylidenediphenol | 4.8 | .076 | 2,160 | 900 |
| G | 1,5-naphthalenediol | 1.2 | .083 | 1,860 | 1,330 |
| H | p,p'-Biphenol | 1.5 | .169 | 2,890 | 2,180 |

Example I

One step preparation of hydroxy-terminated copoly(p,o-phenylene oxide). This polymer contains para- and ortho-phenylene oxide units in a 65/35 ratio and the concentration of the terminating diol, 4,4'-isopropylidenediphenol, is 1.5 mole percent.

The polymer was prepared as follows:

A one-liter three-neck flask was equipped with a packed column topped by a Dean-Stark azeotrope separator and reflux condenser on the center neck, a nitrogen inlet and thermometer on one side and a dropping funnel with pressure equalizing arm on the other side. A polytetrafluoroethylene-coated magnet was provided to enable the reaction mixture to be stirred magnetically.

Pyridine (400 ml.), benzene (135 ml.), p-chlorophenol (167.0 g., 1.30 moles), o-chlorophenol (90.0 g., .70 mole) and 4,4'-isopropylidenediphenol (6.9 g., 0.03 mole) were weighed into the flask through one of the side necks, and 45% aqueous potassium hydroxide (250.3 g., 8.11 m.e./g., 2.03 moles) was added to the dropping funnel. It was not necessary to purify the reagents in the reaction mixture prior to use.

The top of the reflux condenser was attached to a vacuum line, and the system was flushed several times The following table lists pertinent data relative to several poly(phenylene oxide) stabilizers prepared in the manner first described (all with the same diol). Data relative to stabilizer I is included for comparison.

| | Phenylene oxide units para/ortho | Mole percent diol | Polymer Properties | | |
|---|---|---|---|---|---|
| | | | $[\eta]$ in CHCl$_3$ | M | Hydroxy equiv. wt. |
| Example: | | | | | |
| I | 65/35 | 1.5 | .16 | 1,700 | 1,340 |
| J | 65/35 | 1.5 | .16 | 3,540 | 1,800 |
| K | 70/30 | 2.0 | .16 | 3,990 | 1,910 |
| L | 70/30 | 4.0 | .092 | 1,970 | 1,230 |
| M | 65/35 | 6.0 | .062 | 1,200 | 630 |
| N | 70/30 | 10.0 | .052 | 1,140 | 580 |
| O | 65/35 | 10.0 | .069 | 900 | 536 |

Example P

Preparation of a hydroxy arylene ether from the condensation of 4,4'-isopropylidenediphenol with a chlorinated biphenyl.

Using the equipment described in Example I the condensation of 4,4'-isopropylidenediphenol was carried out with a chlorinated biphenyl which is a viscous, yellow liquid containing about 48% by weight chlorine and have the approximate empirical formula of $C_{12}H_6Cl_4$.

4,4'-isopropylidenediphenol (183.0 g., .80 mole), dimethylsulfoxide (500 ml.) and xylene (130 ml.) were added to the one-liter, three-neck flask and 45% aqueous potassium hydroxide (98.2 g. 8.15 m.e./g., .80 mole) was placed in the dropping funnel. The system was evacuated and flushed with nitrogen during the addition of the base, and water was removed by azeotropic distillation under a slight positive pressure of nitrogen. The temperature of the solution in the flask rose from 130 to 155° C. during the removal of water.

When water no longer collected in the Dean-Stark trap, the solution was cooled below 100° C., and the chlorinated biphenyl (58.4 g., .20 mole) and cuprous chloride (.40 g. .50%) in pyridine (60 ml.) were added through one of the side necks. The mixture was reheated and the clear amber solution became cloudy (precipitation of KCl) as the temperature reached 130° C. Stirring was continued while the temperature was raised to 150° C. during 3 hours, to 175° C. during 1 hour and finally held at this temperature for 2 hours. The solvents were removed under reduced pressure and the residlue was poured into 1 liter of 6 N hydrochloric acid and stirred while the acid was heated to boiling. The mixture was cooled and the aqueous phase was decanted and replaced with fresh 6 N hydrochloric acid. After three such washing cycles the residue was dissolved in benzene (200 ml.), water was removed by azeotropic distillation with a Dean-Stark trap and the dry solution was filtered to remove small amounts of suspended salts (KCl and pyridinium chloride). The benzene and low boiling constituents were removed under reduced pressure, and the viscous, black residue which solidified on cooling was poured hot into containers for storage.

The weight of residue was 178.5 g., 84% of theoretical. Inherent viscosity in 1% chloroform solution was .032. The hydroxyl equivalent weight by the method of Ogg, Porter and Willits cited above was 163 compared with the theoretical value of 265.

The following table lists pertinent data relative to several arylene ether stabilizers prepared from 4,4'-isopropylidenediphenol and various polyhaloaromatic compounds. Data relative to stabilizer P is included for comparison.

Description of the various resins, curing agents and accelerators utilized in the following examples and designations by which they are identified therein are as follows:

Epoxy novolak I: A polymer having an average of about 3.6 epoxy groups per molecule and repeating units of the following structure:

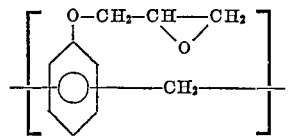

Epoxy novolak II: An epoxy novolak having an epoxy equivalent weight of 270–330 and a functionality of about 5.0 epoxy groups per molecule.

Cur I: 3,6 - endomethylene - 1,2,3,6 - tetrahydro-3(4)-methylphthalic anhydride having the structure:

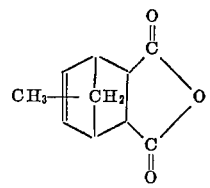

Accel I: 2,4,6 - tris(dimethylamino methyl) phenol.
Accel II: An aliphatic-aromatic phosphite containing a zinc salt of an aliphatic carboxylic acid.

Example 1

Comparison of the high temperature againg properties of laminates of the invention and of control laminates which contain no high temperature stabilizer.

Four syrupy liquid resins were prepared as follows:

|  | Lot 1 | Lot 2 | Lot 3 | Lot 4 |
| --- | --- | --- | --- | --- |
| Epoxy novolak I | 100 | 100 |  |  |
| Epoxy novolak II |  |  | 100 | 100 |
| Stabilizer [1] |  | 25 |  | 25 |
| Accel I | 1 | 1 | 1 | 1 |
| Cur I | 84 | 84 | 84 | 84 |
| Toluene | 21 | 121 | 46 | 58 |

[1] This stabilizer was the poly(phenylene oxide) of Example I.

|  | Diol, moles | Polyhaloaromatic compound | Moles | Percent yield | $[\eta]$ in 1% $CHCl_3$ | Hydroxy equiv. wt. |
| --- | --- | --- | --- | --- | --- | --- |
| Example: |  |  |  |  |  |  |
| P | 4 | $C_{12}H_6Cl_4$ | 1 | 84 | .032 | 163 |
| Q | 2 | $1,4-C_6H_4Br_2$ | 1 | 59 | .034 | 357 |
| R | 3 | $1,2,4-C_6H_3Cl_3$ | 1 | 71 | .031 | 182 |
| S | 3 | $C_{12}H_7Cl_3$ | 1 | 84 | .032 | 163 |
| T | 3.5 | $C_{18}H_{9.5}Cl_{4.5}$ | 1 | 98 | .092 | 232 |

COMPOSITIONS AND ARTICLES

Except as otherwise specifically noted, the compositions and articles of the following examples were prepared as follows: For lots containing an epoxy novolak or an epoxy polymer and an aromatic high temperature stabilizer according to the invention, two solutions were prepared. The first of these contained the stabilizer and the second contained the epoxy novolak or epoxy resin together with the curing agent and accelerator. The amount of solvent in each solution was determined by the viscosity of the solution. The solutions were then mixed. For control lots containing no stabilizer, only a single solution was prepared.

The resulting compositions were used to saturate No. 181 weave glass cloth sized with an amino silane adhesion promoter. The excess resin was drained from the glass cloth and the remaining resin was dried and heated to 120° C. for 6 to 10 minutes to partially cure it to the "B" stage. The saturated cloths were cut and stacked into several layers and laminates were prepared from them by heating for 30 minutes at 175° C. at a pressure of 200 p.s.i., i.e., 14 kg. per sq. cm.

Six ply glass cloth laminates were prepared using each of these resins, the percent resin in the cured laminates of lots 1–4 being respectively 27.8%, 28.0%, 31.6% and 35.6%.

The laminates were aged in air in a circulating oven at 260° C. and their 260° C. flexural strength, flexural modulus and weight loss properties were measured after various times. The results are indicated in the following tables:

LOT 1

|  | Flexural strength at 260° C. ×$10^{-3}$ (p.s.i.) | Flexural modulus at 260° C. ×$10^{-5}$ (p.s.i.) | Resin weight loss (percent) |
| --- | --- | --- | --- |
| Hours aged at 260° C.: |  |  |  |
| 2 | 17.4 | 1.5 |  |
| 95 | 29.2 | 1.8 |  |
| 192 | 22.3 | 1.6 | 15.0 |
| 424 | 8.2 | 0.9 | 42.5 |
| 500 | 4.2 | 0.4 | 46.0 |
| 940 | (¹) | (¹) | 79.0 |

|   | Flexural strength at 260° C. ×10⁻³ (p.s.i.) | Flexural modulus at 260° C. ×10⁻⁶ (p.s.i.) | Resin weight loss (percent) |
|---|---|---|---|
| LOT 2 | | | |
| Hours aged at 260° C.: | | | |
| 2 | 11.6 | 1.1 | |
| 95 | 17.8 | 1.5 | |
| 192 | 18.7 | 1.5 | 12.9 |
| 424 | 29.5 | 2.1 | 20.8 |
| 500 | 27.6 | 2.0 | 22.5 |
| 940 | 21.4 | 1.7 | 35.0 |
| LOT 3 | | | |
| Hours aged at 260° C.: | | | |
| 2 | 17.0 | 2.7 | |
| 250 | 27.1 | 2.7 | 23.7 |
| 500 | 5.6 | 0.7 | 47.2 |
| 700 | (¹) | (¹) | 65.8 |
| 1,000 | (¹) | (¹) | 79.2 |
| LOT 4 | | | |
| Hours aged at 260° C.: | | | |
| 2 | 28.2 | 2.7 | |
| 250 | 23.9 | 2.4 | 17.5 |
| 500 | 11.4 | 1.4 | 24.7 |
| 700 | | | 33.4 |
| 1,000 | 8.2 | 1.2 | 52.5 |

¹ Too weak to test.

Thus, the laminates of the invention (lots 2 and 4) had greatly superior heat aging properties to the control lots which contained no stabilizer.

Example 2

Comparison of the high temperature aging properties of laminates containing stabilizers having varying hydroxy functionality.

The polymer solutions used to saturate the glass cloth in the lots of this example were as follows:

|   | Lot 1 | Lot 2 | Lot 3 | Lot 4 |
|---|---|---|---|---|
| Epoxy novolak I (g.) | 100 | 100 | 100 | 100 |
| Cur I (g.) | 84 | 84 | 84 | 84 |
| Toluene (g.) | 46 | 131 | 131 | 131 |
| Poly(phenylene oxide) stabilizer amount (g.) | 0 | 25 | 25 | 25 |
| Hydroxy equivalent weight | | 7,900 | 4,300 | 2,200 |

The poly(phenylene oxide) stabilizers in Lots 2–4 were prepared in approximately the same way as those of Examples I–O, but varying the relative amounts of the constituents. Their number average molecular weights were in the range of about 3000–5000.

Eight ply laminates were prepared from these compositions, the molding conditions being 175° C. for 60 minutes at 500 p.s.i. The laminates were aged in air in a circulating oven for 1000 hours at 260° C. and their strength and weight loss properties were then measured as indicated in the following table:

|   | Hydroxyl equivalent weight of stabilizer | Percent polymer lost during heat aging | Flexural modulus at 260° C. after heat aging (p.s.i. × 10⁻⁶) |
|---|---|---|---|
| Lot No.: | | | |
| 1 | (Control) | 64.5 | (¹) |
| 2 | 7,900 | 41.8 | 0.89 |
| 3 | 4,300 | 30.0 | 1.28 |
| 4 | 2,200 | 23.9 | 1.59 |

¹ Too weak to test.

Thus, of these four laminates, the control which contained no stabilizer had the poorest resistance to high temperature and, of the three laminates made with stabilizer, the heat resistance was proportional to the hydroxyl content thereof.

Example 3

Relative resistance to heat aging of a laminate of the invention and of other types of laminates.

All of the following laminates were made using number 181 weave glass cloth sized with an amino silane adhesion promoter.

Lot 1—A laminate of the present invention:

Recipe:

Epoxy Novolak I (g.) _____ 100
Cur I (g.) _____ 84
Stabalizer of Example I _____ 25
Accel II _____ 5
Toluene _____ 50

A 12 ply laminate was prepared from the glass cloth saturated with this composition and was cured as follows:

Cure: 30 minutes at 165° C. at 300 p.s.i.

Post cure: 16 hr. at 204° C., 4 hr. at 232° C. and 21 hr. at 260° C.

Lot 2—A phenyl silane laminate: This was a 14 ply laminate. The saturating resin was a phenolic-silicone copolymer prepared by cross-linking an A-stage phenolic resin through silicone blocks. The cure cycle of this laminate was as follows:

Cure: 35 min. at 132–138° C. at 200 p.s.i., cool under pressure,

Post cure: 24 hours each at 121°, 149°, 176° and 204° C.

Lot 3—A polymethylene diphenylene oxide laminate: This was a 13 ply laminate given a normal cure cycle.

Lot 4—A phenolic resin laminate: This was a 12 ply laminate given a normal cure cycle for the resin (30 minutes at 165° C. and 1000 p.s.i. pressure).

The results of tests run on the resulting laminates are as follows:

|   | Lot 1 | Lot 2 | Lot 3 | Lot 4 |
|---|---|---|---|---|
| Cured resin content, percent | 27.2 | 26.0 | 33.3 | 41.9 |
| 260° C. flexural str (p.s.i.) Initial | 23,500 | 34,900 | 34,400 | 37,200 |
| After 250 hrs. at 260° C | 25,700 | 41,000 | 17,300 | 33,600 |
| After 500 hrs. at 260° C | 29,800 | 29,600 | 7,800 | |
| After 750 hrs. at 260° C | | | 3,700 | (¹) |
| After 1,000 hrs. at 260° C | 25,000 | 17,800 | (¹) | (¹) |
| Percent resin weight loss after 1,000 hrs. at 260° C | 34.4 | 30.6 | 79.8 | 82.0 |

¹ Too weak to test.

Thus the laminate of the present invention (Lot 1) has the best long-term heat aging properties of the four laminates tested.

Example 4

The effect of varying the amount of stabilizer in the laminates of the invention on their high temperature properties.

The stabilizer utilized in this example was a poly(phenylene oxide) containing 37% o- and 63% p-phenylene oxide units and having a hydroxy equivalent weight of 5800. It was prepared by the same general process used in Examples I–O but varying the amounts of the ortho and para isomers slightly and utilizing no 4,4′-isopropylidenediphenol.

Three compositions containing different amounts of this stabilizer and one containing no stabilizer (a control) were prepared. Different amounts of solvent were used in the various lots since poly(phenylene oxide) stabilizer tends to increase the viscosity of the composition.

Six ply glass cloth laminates were prepared utilizing the compositions of the four lots. The laminates were prepared as previously described except that an additional post cure was given to the laminates as follows: 15 hours at 190° C.; 1½ hrs. at 218° C.; and 1½ hrs. at 246° C. The resin solutions used to saturate the glass cloth therein and the percent by weight of resin in the cured laminates are given in the following table:

|   | Lot 1 | Lot 2 | Lot 3 | Lot 4 |
|---|---|---|---|---|
| Epoxy novolak I | 100 | 100 | 100 | 100 |
| Stabilizer | 0 | 25 | 62 | 185 |
| Accel I | 1 | 1 | 1 | 0 |
| Cur I | 84 | 84 | 84 | 84 |
| Dioxane | 56 | 100 | 166 | 386 |
| Percent stabilizer in Resin (solids basis), percent | 0 | 12 | 25 | 50 |
| Resin content in cured laminate, percent by weight | 25.3 | 27.0 | 27.8 | 25.8 |
| Specific gravity of laminate | 1.75 | 1.76 | 1.82 | 1.78 |

These laminates were then aged in air in a circulating oven at 277° C. and strength properties were masured after various times at both room temperature and at 260° C. as indicated in the following tables.

|  | Room Temperature Flexural Strength (p.s.i.×10⁻³) | | | |
| --- | --- | --- | --- | --- |
|  | Lot 1 | Lot 2 | Lot 3 | Lot 4 |
| Hours aged at 277° C.: |  |  |  |  |
| 4 | 47.0 | 54.0 | 56.2 | 48.0 |
| 100 | 17.1 | 49.0 | 41.7 | 50.3 |
| 213 | 6.2 | 35.9 | 42.2 | 38.4 |
| 320 | 3.5 | 31.7 | 32.7 | 35.8 |
| 400 | 2.5 | 25.1 | 27.2 | 28.4 |
| 500 | 2.4 | 18.3 | 21.4 | 29.8 |

|  | Flexural Strength at 260° C. (p.s.i.×10⁻³) | | | |
| --- | --- | --- | --- | --- |
|  | Lot 1 | Lot 2 | Lot 3 | Lot 4 |
| Hours aged at 277° C.: |  |  |  |  |
| 4 | 21.1 | 17.0 | 12.2 | 5.2 |
| 100 | 14.7 | 19.5 | 15.6 | 9.8 |
| 213 | 3.6 | 22.0 | 16.0 | 7.2 |
| 320 | 2.4 | 16.7 | 14.4 | 9.4 |
| 400 | 1.3 | 11.3 | 12.7 | 5.4 |
| 500 | 1.5 | 11.0 | 11.7 | 6.8 |

Thus, after 500 hours of heat aging the room temperature flexural strength of the laminate prepared from the resin containing 50% of stabilizer was the greatest while the 260° C. flexural strength of the laminates prepared from resins containing 12% and 25% of stabilizer were the greatest and were approximately equal.

What is claimed is:
1. A stable, thermohardenable resin composition comprising a blend of
   (a) 30 to 75 parts of an epoxy novolak polymer,
   (b) 20 to 65 parts of a curing agent for an epoxy resin selected from anhydride, acid, phenolic and amine curing agents, and
   (c) an effective amount of at least 3 parts of a non-volatile, thermally stable, high temperature arylene ether stabilizer which has a number average molecular weight of 500 to 5000 and a hydroxyl equivalent weight of from about 160 to 10,000,
the parts being by weight and the sum thereof being 100.

2. A stable, thermohardenable resin composition comprising a blend of
   (a) 30 to 75 parts of a soluble epoxy novolak polymer,
   (b) 20 to 65 parts of a curing agent for an epoxy resin selected from anhydride, acid, phenolic and amine curing agents,
   (c) 3 to 30 parts of a non-volatile, thermally stable high temperature arylene ether stabilizer which has a number average molecular weight of 500 to 5000 and a hydroxyl equivalent weight of from about 160 to 10,000 and
   (d) an effective amount of at least 0.5 part of an accelerator for an epoxy resin,
the parts being by weight and the sum thereof being 100.

3. A stable, thermohardenable resin composition comprising a blend of
   (a) 30 to 75 parts of a soluble epoxy novolak polymer,
   (b) 20 to 65 parts of a curing agent for an epoxy resin selected from anhydride, acid, phenolic and amine curing agents,
   (c) 3 to 30 parts of a non-volatile, thermally stable poly-(phenylene oxide) stabilizer which has a number average molecular weight of 500 to 5000 and a hydroxyl equivalent weight of from about 160 to 10,000 and
   (d) an effective amount of at least 0.5 part of an accelerator for an epoxy resin,
the parts being by weight and the sum thereof being 100.

4. A resin composition according to claim 3 wherein the poly-(phenylene oxide) contains approximately 35 percent ortho- and 65 percent para-phenylene oxide units.

5. A resin composition according to claim 2 wherein the accelerator is 2,4,6-tris(dimethylamino methyl) phenol.

6. A resin composition according to claim 2 wherein the curing agent is an anhydride.

7. A resin composition according to claim 6 wherein the anhydride curing agent is 3,6-endomethylene-1,2,3,6-tetrahydro-3(4)-methylphthalic anhydride.

8. A resin composition according to claim 2 wherein the epoxy novolak polymer contains an average of about 3.6 epoxy groups per molecule.

9. A cured reaction product of
   (a) 30 to 75 parts of a soluble epoxy novolak polymer,
   (b) 20 to 65 parts of a curing agent for an epoxy resin selected from anhydride, acid, phenolic and amine curing agents and
   (c) an effective amount of at least 3 parts of a non-volatile, thermally stable high temperature arylene ether stabilizer which has a number average molecular weight of 500 to 5000 and a hydroxy equivalent weight of from about 160 to 10,000,
the parts being by weight and the sum thereof being 100.

10. A cured reaction product of
    (a) 30 to 75 parts of a soluble epoxy novolak polymer,
    (b) 20 to 65 parts of a curing agent for an epoxy resin selected from anhydride, acid, phenolic and amine curing agents,
    (c) 3 to 30 parts of a non-volatile, thermally stable high temperature arylene ether stabilizer which has a number average molecular weight of 500 to 5000 and a hydroxy equivalent weight of from about 160 to 10,000 and
    (d) an effective amount of at least 0.5 part of an accelerator for an epoxy resin,
the parts being by weight and the sum thereof being 100.

11. A cured reaction product according to claim 10 wherein the stabilizer is a poly-(phenylene oxide).

12. A filament-reinforced structure comprising a thermohardenable blend of
    (a) 30 to 75 parts of an epoxy novolak polymer,
    (b) 20 to 65 parts of a curing agent for an epoxy resin selected from anhydride, acid, phenolic and amine curing agents and
    (c) an effective amount of at least 3 parts of a non-volatile, thermally stable, high temperature arylene ether stabilizer which has a number average molecular weight of 500 to 5000 and a hydroxyl equivalent weight of from about 160 to 10,000,
the parts being by weight and the sum thereof being 100.

13. A filament-reinforced structure comprising a thermohardenable blend of
    (a) 30 to 75 parts of a soluble epoxy novolak polymer,
    (b) 20 to 65 parts of a curing agent for an epoxy resin selected from anhydride, acid, phenolic and amine curing agents,
    (c) 3 to 30 parts of a non-volatile, thermally stable high temperature arylene ether stabilizer which has a number average molecular weight of 500 to 5000 and a hydroxyl equivalent weight of from about 160 to 10,000 and
    (d) an effective amount of at least 0.5 part of an accelerator for an epoxy resin,
the parts being by weight and the sum thereof being 100.

14. A filament-reinforced structure according to claim 13 wherein the stabilizer is a poly-(phenylene oxide).

15. A filament-reinforced structure which comprises a cured reaction product of
    (a) 30 to 75 parts of a soluble epoxy novolak polymer,
    (b) 20 to 65 parts of a curing agent for an epoxy resin selected from anhydride, acid, phenolic and amine curing agents.
    (c) 3 to 30 parts of a non-volatile, thermally stable high temperature arylene ether stabilizer which has a number average molecular weight of 500 to 5000 and a hydroxy equivalent weight of from about 160 to 10,000 and
(d) an effective amount of at least 0.5 part of an accelerator for an epoxy resin,
the parts being by weight and the sum thereof being 100.

16. A stable blend of
(a) 20 to 65 parts of a curing agent for an epoxy resin selected from anhydride, acid, phenolic and amine curing agents,
(b) 3 to 30 parts of a non-volatile, thermally stable, high temperature arylene ether stabilizer which has a number average molecular weight of 500 to 5000 and a hydroxyl equivalent weight of from about 160 to 10,000 and
(c) an effective amount of at least 0.5 part of an accelerator for an epoxy resin, said blend being adapted to be mixed with an epoxy novolak polymer to form a thermohardenable resin composition, the parts being by weight.

References Cited
UNITED STATES PATENTS

| | | | |
|---|---|---|---|
| 2,890,194 | 6/1959 | Phillips et al. | 260—835 |
| 3,275,708 | 9/1966 | Bylsma | 260—830 |
| 3,330,806 | 7/1967 | Borman | 260—47 |
| 3,367,990 | 2/1968 | Bremmer | 260—831 |
| 3,375,298 | 3/1968 | Fox | 260—830 |

DONALD E. CZAJA, Primary Examiner
R. A. WHITE, Assistant Examiner

U.S. Cl. X.R.
117—126; 161—185; 260—37, 45.95, 47